US011028324B2

(12) United States Patent
Bauer et al.

(10) Patent No.: US 11,028,324 B2
(45) Date of Patent: *Jun. 8, 2021

(54) FLAME RETARDANT MIXTURES, THE PRODUCTION AND THE USE THEREOF

(71) Applicant: CLARIANT PLASTICS & COATINGS LTD, Muttenz (CH)

(72) Inventors: Harald Bauer, Kerpen (DE); Sebastian Hörold, Diedorf (DE); Martin Sicken, Cologne (DE)

(73) Assignee: Clariant Plastics & Coatings Ltd, Muttenz (CH)

(*) Notice: Subject to any disclaimer, the term of this patent is extended or adjusted under 35 U.S.C. 154(b) by 15 days.

This patent is subject to a terminal disclaimer.

(21) Appl. No.: 16/318,526

(22) PCT Filed: Jul. 12, 2017

(86) PCT No.: PCT/EP2017/067611
§ 371 (c)(1),
(2) Date: Jan. 17, 2019

(87) PCT Pub. No.: WO2018/015253
PCT Pub. Date: Jan. 25, 2018

(65) Prior Publication Data
US 2019/0316039 A1    Oct. 17, 2019

(30) Foreign Application Priority Data

Jul. 20, 2016 (DE) .................... 10 2016 213 282.2

(51) Int. Cl.
| C09K 21/12 | (2006.01) |
| C08J 3/20 | (2006.01) |
| C08K 3/32 | (2006.01) |
| C08K 5/5377 | (2006.01) |
| C08K 5/5393 | (2006.01) |
| C09K 21/04 | (2006.01) |

(52) U.S. Cl.
CPC .............. C09K 21/12 (2013.01); C08J 3/203 (2013.01); C08K 3/32 (2013.01); C08K 5/5377 (2013.01); C08K 5/5393 (2013.01); C09K 21/04 (2013.01); C08K 2003/328 (2013.01)

(58) Field of Classification Search
CPC .. C09K 21/12; C09K 21/04; C08K 2003/328; C08K 5/5393; C08K 3/32; C08K 5/5377
USPC ........................................................ 524/123
See application file for complete search history.

(56) References Cited

U.S. PATENT DOCUMENTS

| 3,450,407 | A1 | 5/2013 | Prusty et al. |
| 8,450,407 | B2 | 5/2013 | Rusty et al. |
| 8,889,772 | B2 | 11/2014 | Hill et al. |
| 9,802,970 | B2 | 10/2017 | Yao et al. |
| 10,508,238 | B2 | 12/2019 | Bauer et al. |
| 10,633,509 | B2 | 4/2020 | Bauer et al. |
| 2012/0208937 | A1 | 8/2012 | Prusty et al. |
| 2013/0334477 | A1 | 9/2013 | Taketani et al. |
| 2015/0183991 | A1* | 7/2015 | Yamamoto ............... C08K 3/04 524/126 |

FOREIGN PATENT DOCUMENTS

| CN | 102666693 A | 9/2012 |
| CN | 103788125 A | 5/2014 |
| CN | 103897215 A | 7/2014 |
| CN | 105061500 A | 11/2015 |
| DE | 10 2010 018684 A1 | 11/2011 |
| DE | 10 2014 001222 A1 | 7/2015 |
| EP | 3091023 A1 | 11/2016 |
| JP | 2006-143844 A | 6/2006 |
| JP | 2013-508522 A | 3/2013 |
| JP | 2015-120891 A | 7/2015 |
| TW | 201233790 A | 8/2012 |
| WO | 2011/051121 A1 | 5/2011 |
| WO | 2014/134875 A1 | 9/2014 |
| WO | 2015/101136 A1 | 7/2015 |
| WO | 2015/149265 A1 | 10/2015 |
| WO | 2016/150846 A1 | 9/2016 |

OTHER PUBLICATIONS

Office Action dated Oct. 26, 2020, issued in corresponding Indian Patent Application No. 201817049107.
Office Action dated Oct. 26, 2020, issued in corresponding Indonesian Patent Application No. PID201900012.
1st Search Report and Written Opinion dated Mar. 3, 2020, issued in corresponding Singapore Patent Application No. 11201811638Q (in English).
2nd Written Opinion dated Nov. 4, 2020, issued in corresponding Singapore Patent Application No. 11201811638Q (in English).
Gallo et al., "Flame Retardant biocomposites: Synergism between phosphinate and nanometric metal oxides", European Polymer Journal, vol. 47, No. 7, Apr. 16, 2011, pp. 1390-1401.
International Search Report dated Oct. 18, 2017, issued in corresponding International Patent Application No. PCT/EP2017/067611.
Notification of Office Action dated Mar. 20, 2019, issued in Vietnamese Patent Application No. 1-2018-05983.
European Search Report dated Jun. 23, 2020, issued in European Application No. 17740723.6.
Office Action dated Nov. 9, 2020, issued in corresponding Taiwanese Patent Application No. 106118921.

* cited by examiner

*Primary Examiner* — Hui H Chin
(74) *Attorney, Agent, or Firm* — Morgan, Lewis & Bockius LLP

(57) ABSTRACT

The invention relates to a flame retardant mixture comprising
99.9999% to 87% by weight of diorganylphosphinic acid salts as component A) and
0.0001% to 13% by weight of iron as component B),
where the sum total of A) and B) is 100% by weight.
The invention likewise relates to processes for producing the aforementioned flame retardant mixture and to the use thereof.

15 Claims, No Drawings

FLAME RETARDANT MIXTURES, THE PRODUCTION AND THE USE THEREOF

According to the prior art, dialkylphosphinic acids (also referred to as dialkylphosphinates) are used in flame retardant mixtures in the form of their Mg, Ca, Al, Sb, Sn, Ge, Ti, Fe, Zr, Zn, Ce, Bi, Sr, Mn, Li, Na and K salts.

The flame retardant mixtures according to the prior art have limited thermal stability. They are effective within a restricted temperature range in which the starting materials can be compounded from polymer, flame retardants, glass fibers and further additives to give flame-retardant polymer molding compounds. This is referred to as a processing window bounded by a lower and an upper temperature limit.

The lower temperature limit arises in that only over and above a certain temperature is the viscosity of the polymer low enough for it to be transportable and miscible in the machines.

The upper temperature is manifested indirectly in breakdown of the ingredients and the later efflorescence of breakdown products when the flame-retardant polymer molding compounds and polymer moldings are stored under moist conditions. If the polymer breaks down, the mechanical strength values of the flame-retardant polymer moldings (modulus of elasticity, flexible strength, elongation at break) can also be reduced.

It is therefore an object of the present invention to provide a more thermally stable flame retardant mixture having a broad processing window.

The object is achieved by addition of iron to the salts of diorganylphosphinic acids and especially of dialkylphosphinic acids.

It has been found that, surprisingly, the flame retardant mixtures of the invention have a broader processing window in the compounding of flame-retardant polymer molding compounds and in the injection molding of flame-retardant polymer moldings and simultaneously exhibit good flame retardancy.

The invention therefore relates to a flame retardant mixture comprising
99.9999% to 87% by weight of diorganylphosphinic acid salts as component A) and
0.0001% to 13% by weight of iron as component B),
where the sum total of A) and B) is 100% by weight.

The iron may be present in the form of iron itself, i.e. in elemental form. However, the iron is preferably in the form of a substance containing iron, i.e. of an iron compound or iron alloy.

The invention therefore likewise relates to a flame retardant mixture comprising
99.9999% to 75% by weight of diorganylphosphinic acid salts as component A) and
0.0001% to 13% by weight of iron in the form of an iron-containing substance B1) as component B), where the amount of B1) is 0.0001% to 25% by weight and
where the sum total of A) and B1) is 100% by weight.

The diorganylphosphinic salts preferably conform to the formula (II)

where
$R^1$ and $R^2$ are the same or different and are $C_1$-$C_{18}$-alkyl in linear, branched or cyclic form, $C_6$-$C_{18}$-aryl, $C_7$-$C_{18}$-arylalkyl and/or $C_7$-$C_{18}$-alkylaryl,
m is 1 to 4 and
M is Mg, Ca, Al, Sb, Sn, Ge, Ti, Zr, Zn, Ce, Bi, Sr, Mn, Li, Na and/or K.

It has been found that, surprisingly, the flame retardant mixtures of the invention have a broader processing window in the compounding of flame-retardant polymer molding compounds and in the injection molding of flame-retardant polymer moldings, and simultaneously exhibit good flame retardancy.

Preferably, $R^1$, $R^2$ in formula (II) are the same or different and are independently methyl, ethyl, n-propyl, isopropyl, butyl, n-butyl, tert-butyl, n-pentyl, 2-pentyl, 3-pentyl, 2-methylbutyl, 3-methylbutyl (isopentyl), 3-methylbut-2-yl, 2-methylbut-2-yl, 2,2-dimethylpropyl (neopentyl), hexyl, heptyl, octyl, nonyl, decyl, cyclopentyl, cyclopentylethyl, cyclohexyl, cyclohexylethyl, phenyl, phenylethyl, methylphenyl and/or methylphenylethyl.

More particularly, the flame retardant mixture contains 99.999% to 98% by weight of component A) and 0.001% to 2% by weight of component B).

Preferably, component B1) is present in the flame retardant mixture of the invention in the form of iron(II) dialkylphosphinates, iron(III) dialkylphosphinates, iron(II) monoalkylphosphinates, iron(III) monoalkylphosphinates, iron(II) alkylphosphonates, iron(III) alkylphosphonates, iron(II) phosphite, iron(III) phosphite, iron(II) phosphate and/or iron(III) phosphate.

More preferably, component B1) is present in the flame retardant mixture of the invention in the form of iron(II) bis- and/or iron(III) tris(diethylphosphinate), -(dipropylphosphinate), -(butylethylphosphinate), -(n-butylethylphosphinate), -(sec-butylethylphosphinate), -(hexylethylphosphinate), -(dibutylphosphinate), -(hexylbutylphosphinate), -(octylethylphosphinate), -(ethyl(cyclopentylethyl)phosphinate), -(butyl(cyclopentylethyl)phosphinate), -(ethyl(cyclohexylethyl)phosphinate), -(butyl(cyclohexylethyl)phosphinate), -(ethyl(phenylethyl)phosphinate), -(butyl(phenylethyl)phosphinate), -(ethyl(4-methylphenylethyl)phosphinate), -(butyl(4-methylphenylethyl)phosphinate), -(butylcyclopentylphosphinate), -(butylphenylphosphinate), -(ethyl(4-methylphenyl)phosphinate) and/or -(butyl(4-methylphenyl)phosphinate; or iron(II) mono- and/or iron(III)mono (ethylphosphinate), -(propylphosphinate), -(butylphosphinate), -(n-butylphosphinate), -(sec-butylphosphinate), -(hexylphosphinate) and/or -(octylphosphinate), or of iron(II)- and/or iron(III) ethylphosphonate, propylphosphonate, butylphosphonate, n-butylphosphonate, sec-butylphosphonate, hexylphosphonate and/or octylphosphonate.

More preferably, components A) and B1) are in the form of a physical mixture.

Preferably, the flame retardant mixtures of the invention comprise
60% to 99.8999% by weight of component A),
0.0001% to 20% by weight of component B1) and
0.1% to 40% by weight of a further component C),
where the sum total of components A), B1) and C) is 100% by weight, with the proviso that components A), B1) and C) are each different compounds.

Preferably, components A), B1) and C) are in the form of a physical mixture.

Preferably, components A) and C) form a homogeneous chemical compound with one another, and the latter is then in the form of a physical mixture with component B1).

Component C) comprises telomers of the formula (III)

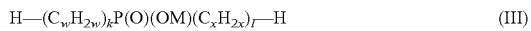
$$H-(C_wH_{2w})_kP(O)(OM)(C_xH_{2x})_l-H \quad (III)$$

where, in formula (III), independently of one another,
k is 1 to 9, l is 1 to 9,
w is 2 to 9, x is 2 to 9,
and
M is Mg, Ca, Al, Sb, Sn, Ge, Ti, Fe, Zr, Zn, Ce, Bi, Sr, Mn, Li, Na, K and/or a protonated nitrogen base,
and the $(C_wH_{2w})_k$, $(C_xH_{2x})_l$ groups may be linear or branched;
and/or the telomers are those of the formula (I)

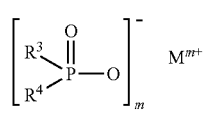

where
$R^3$, $R^4$ are the same or different and are $C_6$-$C_{10}$-arylene, $C_7$-$C_{20}$-alkylarylene, $C_7$-$C_{20}$-arylalkylene and/or $C_3$-$C_{16}$-cycloalkyl or -bicycloalkyl,
M is Mg, Ca, Al, Sb, Sn, Ge, Ti, Fe, Zr, Zn, Ce, Bi, Sr, Mn, Li, Na, K and/or a protonated nitrogen base, and where components A) and C) are different compounds.

More preferably, in formula (III), w and x are each 2 or 3 and k and l are each 1 to 3 and M is Al, Ti, Fe or Zn.

Preferably, the telomers are metal salts of ethylbutylphosphinic acid, dibutylphosphinic acid, ethylhexylphosphinic acid, butylhexylphosphinic acid, ethyloctylphosphinic acid, sec-butylethylphosphinic acid, 1-ethylbutyl(butyl)phosphinic acid, ethyl(1-methylpentyl)phosphinic acid, di-sec-butylphosphinic acid (di-1-methylpropylphosphinic acid), propyl(hexyl)phosphinic acid, dihexylphosphinic acid, hexyl(nonyl)phosphinic acid, propyl(nonyl)phosphinic acid, dinonylphosphinic acid, dipropylphosphinic acid, butyl(octyl)phosphinic acid, hexyl(octyl)phosphinic acid, dioctylphosphinic acid, ethyl(cyclopentylethyl)phosphinic acid, butyl(cyclopentylethyl)phosphinic acid, ethyl(cyclohexylethyl)phosphinic acid, butyl(cyclohexylethyl)phosphinic acid, ethyl(phenylethyl)phosphinic acid, butyl(phenylethyl)phosphinic acid, ethyl(4-methylphenylethyl)phosphinic acid, butyl(4-methylphenylethyl)phosphinic acid, butylcyclopentylphosphinic acid, butylcyclohexylethylphosphinic acid, butylphenylphosphinic acid, ethyl(4-methylphenyl)phosphinic acid and/or butyl(4-methylphenyl)phosphinic acid, where the metal of the metal salt comes from the group of Mg, Ca, Al, Sb, Sn, Ge, Ti, Fe, Zr, Zn, Ce, Bi, Sr, Mn, Li, Na and/or K.

Preferably, the flame retardant mixtures of the invention further comprise synergists as component D), where the synergists are melamine phosphate, dimelamine phosphate, pentamelamine triphosphate, trimelamine diphosphate, tetrakismelamine triphosphate, hexakismelamine pentaphosphate, melamine diphosphate, melamine tetraphosphate, melamine pyrophosphate, melamine polyphosphates, melam polyphosphates, melem polyphosphates and/or melon polyphosphates; or melamine condensation products such as melam, melem and/or melon; or oligomeric esters of tris(hydroxyethyl) isocyanurate with aromatic polycarboxylic acids, benzoguanamine, tris(hydroxyethyl) isocyanurate, allantoin, glycoluril, melamine, melamine cyanurate, urea cyanurate, dicyandiamide and/or guanidine; or nitrogen-containing phosphates of the formula $(NH_4)_yH_{3-y}PO_4$ or $(NH_4PO_3)_z$, with y=1 to 3 and z=1 to 10 000; or aluminum phosphites, aluminum pyrophosphites, aluminum phosphonates, aluminum pyrophosphonates; or silicates, zeolites, silicas, ceramic powder, zinc compounds, e.g. zinc borate, zinc carbonate, zinc stannate, zinc hydroxystannate, zinc phosphate, zinc sulfide, zinc oxide, zinc hydroxide, tin oxide hydrate, basic zinc silicate, zinc molybdate, magnesium hydroxide, hydrotalcite, magnesium carbonate and/or calcium magnesium carbonate.

The flame retardant mixtures in this case preferably comprise
a) 0.0001% to 99.7999% by weight of component A),
b) 0.0001% to 99.7999% by weight of component B1),
c) 0.1% to 40% by weight of component C) and
d) 0.1% to 40% by weight of component D),
where the sum total of a), b), c) and d) is 100% by weight, with the proviso that components A), B1) and C) are different compounds.

The flame retardant mixtures preferably have
a particle size of 0.01 to 1000 μm,
a bulk density of 50 to 1500 g/L,
a tamped density of 100 g/L to 1100 g/L,
an angle of repose of 5 to 45 degrees,
a BET surface area of 1 to 40 m²/g,
L color values of 85 to 99.9,
a color values of −4 to +9,
b color values of −2 to +6.

The flame retardant mixtures more preferably have
a particle size of 0.5 to 800 μm,
a bulk density of 80 to 800 g/L,
a tamped density of 600 g/L to 800 g/L,
an angle of repose of 10 to 40 degrees.

The invention also relates to a process for producing flame retardant mixtures as claimed in one or more of claims 1 to 18, which comprises
a) in a process stage 1 adding 0.9 to 1.1 molecules of olefin per P onto a water-soluble salt of the hypophosphorous acid or the acid itself,
b) in a process stage 2 adding 0.9 to 1.1 additional molecules of olefin per P onto the intermediate from a) to give dialkylphosphinic acid or salt thereof,
c) in a process stage 3 adding 1 to 9 further olefin molecules onto 0% to 20% of the dialkylphosphinate molecules from process stage 1, so as to form telomers, with conversion of dialkylphosphinic acid, if it is formed, to a corresponding salt,
d) in a process stage 4 conducting a crystallization of the intermediate from b) and/or c) and a metal salt,
e) in a process stage 5 mixing in an iron compound/component B.

The invention likewise relates to a process for producing flame retardant mixtures as claimed in one or more of claims 1 to 18, which comprises
a) in a process stage 1 adding 0.9 to 1.1 molecules of olefin per P onto a water-soluble salt of the hypophosphorous acid or the acid itself,
b) in a process stage 2 adding 0.9 to 1.1 additional molecules of olefin per P onto the intermediate from a) to give dialkylphosphinic acid or salt thereof,
c) in a process stage 3 adding 1 to 9 further olefin molecules onto 0.1% to 20% of the dialkylphosphinate molecules from process stage 1, so as to form telomers, with conversion of dialkylphosphinic acid, if it is formed, to a corresponding salt, d) in a process stage 4 conducting a coprecipitation of the intermediate from c) and a metal salt, and
e) in a process stage 5 mixing in an iron compound/component B.

The invention relates to a further process for producing flame retardant mixtures as claimed in one or more of claims 1 to 18, which comprises
a) in a process stage 1 adding 0.9 to 1.1 molecules of olefin per P onto a water-soluble salt of the hypophosphorous acid or the acid itself,
b) in a process stage 2 adding 0.9 to 1.1 additional molecules of olefin per P onto the intermediate from a) to give dialkylphosphinic acid or salt thereof, with conversion of dialkylphosphinic acid, if it is formed, to a corresponding salt,
c) in a process stage 3 conducting a coprecipitation of the intermediate from b) and an iron salt, and
d) in a process stage 4 mixing in the telomers/component C.

Finally, the invention relates to a process for producing flame retardant mixtures as claimed in one or more of claims 1 to 18, which comprises
a) in a process stage 1 adding 0.9 to 1.1 molecules of olefin per P onto a water-soluble salt of the hypophosphorous acid or the acid itself,
b) in a process stage 2 adding 0.9 to 1.1 additional molecules of olefin per P onto the intermediate from a) to give dialkylphosphinic acid or salt thereof, with conversion of dialkylphosphinic acid, if it is formed, to a corresponding salt,
c) in a process stage 3) conducting a crystallization of the intermediate from b) and a metal salt,
e) in a process stage 4 optionally mixing in telomers and
f) in a process stage 5 mixing in an iron compound/component B.

The iron compounds and/or iron salts used in the aforementioned processes are those with anions of the seventh main group; with anions of the oxo acids of the seventh main group; with anions of the sixth main group; with anions of the oxo acids of the sixth main group; with anions of the fifth main group; with anions of the oxo acids of the fifth main group; with anions of the oxo acids of the fourth main group; with anions of the oxo acids of the third main group; with anions of the pseudohalides; with anions of the oxo acids of the transition metals; with organic anions from the group of the mono-, di-, oligo- and polycarboxylic acids, of acetic acid, of trifluoroacetic acid, propionates, butyrates, valerates, caprylates, oleates, stearates, of oxalic acid, of tartaric acid, citric acid, benzoic acid, salicylates, lactic acid, acrylic acid, maleic acid, succinic acid, of amino acids, of acidic hydroxo functions, para-phenolsulfonates, para-phenolsulfonate hydrates, acetylacetonate hydrates, tannates, dimethyldithiocarbamates, trifluoromethanesulfonate, alkylsulfonates and/or aralkylsulfonates; as elemental iron; as iron compound in the form of the fluorides, chlorides, bromides, iodides, iodate, perchlorate, oxides, hydroxides, peroxides, superoxides, sulfates, hydrogensulfates, sulfate hydrates, sulfites, peroxosulfates, nitrides, phosphides, nitrates, nitrate hydrates, nitrites, phosphates, peroxophosphates, phosphites, hypophosphites, pyrophosphates, carbonates, hydrogencarbonates, hydroxide carbonates, carbonate hydrates, silicates, hexafluorosilicates, hexafluorosilicate hydrates, stannates, borates, polyborates, peroxoborates, thiocyanates, cyanates, cyanides, chromates, chromites, molybdates, permanganates, formates, acetates, acetate hydrates, trifluoroacetate hydrates, propionates, butyrates, valerates, caprylates, oleates, stearates, oxalates, tartrates, citrates, basic citrates, citrate hydrates, benzoates, salicylates, lactates, lactate hydrates, acrylic acid, maleic acid, succinic acid, glycine, phenoxides, para-phenolsulfonates, para-phenolsulfonate hydrates, acetylacetonate hydrates, tannates, dimethyldithiocarbamates, trifluoromethanesulfonate, alkylsulfonates and/or aralkylsulfonates; and/or in the form of alloys of iron with copper, tin, nickel, chromium, molybdenum, tungsten, vanadium.

Preferably, in the aforementioned processes, the metal salts used are those with a cation from the group of Mg, Ca, Al, Sb, Sn, Ge, Ti, Fe, Zr, Zn, Ce, Bi, Sr, Mn, Li, Na and/or K and the same anions as in the iron compounds and/or as iron salts.

In the aforementioned processes as claimed in one or more of claims 20 to 25, the following are preferably added in the corresponding process stages: initiators, free-radical initiators, photoinitiators, inhibitors, free-radical control auxiliaries, nucleating agents, cocrystallization auxiliaries, crystallization auxiliaries, strong electrolytes, wetting agents, solvents, acids, alkalis, alkaline compounds, strongly alkaline solutions, flow auxiliaries, bleaches, coupling reagents, adhesion promoters, separating agents, plastics additives, coatings additives, and flame retardants ensheathed by the flame retardant mixture as claimed in at least one of claims 1 to 18.

The invention also relates to the use of flame retardant mixtures as claimed in one or more of claims 1 to 18 as an intermediate for further syntheses, as a binder, as a crosslinker or accelerator in the curing of epoxy resins, polyurethanes and unsaturated polyester resins, as polymer stabilizers, as crop protection compositions, as sequestrants, as a mineral oil additive, as an anticorrosive, in washing and cleaning composition applications and in electronics applications.

More particularly, the present invention relates to the use of flame retardant mixtures as claimed in one or more of claims 1 to 18 as a flame retardant, as a flame retardant for clearcoats and intumescent coatings, as a flame retardant for wood and other cellulosic products, as a reactive and/or nonreactive flame retardant for polymers, for production of flame-retardant polymer molding compounds, for production of flame-retardant polymer moldings and/or for rendering polyester and pure and blended cellulose fabrics flame-retardant by impregnation.

The invention also encompasses flame-retardant thermoplastic or thermoset polymer molding compounds or polymer moldings, films, filaments and fibers comprising 0.5% to 45% by weight of flame retardant mixtures as claimed in one or more of claims 1 to 18, 0.5% to 95% by weight of thermoplastic or thermoset polymer or mixtures thereof, 0% to 55% by weight of additives and 0% to 55% by weight of filler or reinforcing materials, where the sum of the components is 100% by weight.

The thermoplastic polymers are those of the HI (high-impact) polystyrene, polyphenylene ether, polyamide, polyester or polycarbonate type, and blends or polymer blends of the ABS (acrylonitrile-butadiene-styrene) or PC/ABS (polycarbonate/acrylonitrile-butadiene-styrene) or PPE/HIPS (polyphenylene ether/HI polystyrene) polymer type, and the thermoset polymers are those of the formaldehyde-, epoxide- or melamine-phenolic resin polymer, unsaturated polyester, epoxy resin and/or polyurethane type.

Preferably, the thermoplastic or thermoset polymer molding compounds, polymer moldings, films, filaments and fibers comprise further additives which are antioxidants, UV stabilizers, gamma ray stabilizers, hydrolysis stabilizers, antistats, emulsifiers, nucleating agents, plasticizers, processing auxiliaries, impact modifiers, dyes, pigments and others.

Preferred diorganylphosphinic salts are the dialkylphosphinic salts which, in that case, likewise conform to the formula (II).

Preferred dialkylphosphinic salts are especially those of the formula (II) in which $R^1$ and $R^2$ are the same or different and are $C_1$-$C_{18}$-alkyl in linear, branched or cyclic form.

Preference is given to diethylphosphinic salts in which the cation for salt formation is Mg, Ca, Al, Sb, Sn, Ge, Ti, Zr, Zn, Ce, Bi, Sr, Mn, Li, Na or K, among which particular preference is given in turn to Al, Ti and Zn.

Preferred flame retardant mixtures comprise 99.9999% to 80% by weight of component A) and 0.0001% to 20% by weight of component B1).

More particularly, the flame retardant mixtures contain 99.9995% to 95% by weight of component A) and 0.0005% to 5% by weight of component B1).

Preference is given to flame retardant mixtures comprising 99.9999% to 80% by weight of component A) and 0.0001% to 20% by weight of iron (component B).

Particular preference is given to flame retardant mixtures comprising 99.9995% to 95% of component A) and 0.0005% to 5% by weight of iron (component B)).

Telomers are formed on addition of the olefin to the hypophosphite ion. Not just two molecules of olefin are added onto the dialkylphosphinate ion, but several. One or both alkyl chains are thus extended by one or more further olefin units.

Preferred telomers are those of the formula (IV)

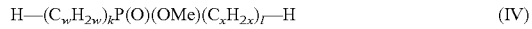

H—$(C_wH_{2w})_k$P(O)(OMe)$(C_xH_{2x})_l$—H  (IV)

where, in formula (IV), independently of one another, k is 1 to 9, l is 1 to 9, w is 2 to 9 and x is 2 to 9 and Me is Mg, Ca, Al, Sb, Sn, Ge, Ti, Fe, Zr, Zn, Ce, Bi, Sr, Mn, Li, Na and/or K.

Preferably, the telomers are in the form of the Al, Ti, Fe and/or Zn salt.

Preferably, in formula (VI), w and x are also each 2 to 4 and k and l are each 1 to 4.

In the case of use of ethylene as olefin in the preparation of the dialkylphosphinic salts of the invention, what are preferably formed are telomers of the ethylbutylphosphinic acid, dibutylphosphinic acid, ethylhexylphosphinic acid, butylhexylphosphinic acid, ethyloctylphosphinate type, etc., and/or salts thereof.

In the case of propene, the sequence is analogous.

Preferred olefins are ethene, propene, 1-butene, 2-butene, 1-pentene, 1-hexene and 1-octene.

The stereochemistry also allows the formation of branched alkyl chains, for example sec-butylethylphosphinate, 1-ethylbutyl(butyl)phosphinate, ethyl(1-methylpentyl)phosphinate, di-sec-butylphosphinate (di(1-methylpropyl)phosphinate) etc.

Telomers themselves are phosphorus compounds. The content thereof is reported in percent of all phosphorus-containing ingredients (P %) It is determined by means of $^{31}$P NMR.

The iron is preferably in the form of an iron salt or iron compound and is in a physical mixture with component A). By virtue of the processes according to the invention, it is in a homogeneous mixture with the dialkylphosphinic salt or the dialkylphosphinic salt/telomer salt mixture.

The iron salts and the iron compounds for preparation of the physical flame retardant mixtures of the invention are preferably iron(II) and/or iron(III) salts.

Preferably, the iron salts are iron(II) salts and/or iron(III) salts with inorganic anions of the seventh main group (halides), for example fluorides, chlorides, bromides, iodides; with anions of the oxo acids of the seventh main group (hypohalites, halites, halogenates, e.g. iodate, perhalogenates, e.g. perchlorate); with anions of the sixth main group (chalcogenides), for example oxides, hydroxides, peroxides, superoxides; with anions of the oxo acids of the sixth main group (sulfates, hydrogensulfates, sulfate hydrates, sulfites, peroxosulfates); with anions of the fifth main group (pnicogenides), for example nitrides, phosphides; with anions of the oxo acids of the fifth main group (nitrate, nitrate hydrates, nitrites, phosphates, peroxophosphates, phosphites, hypophosphites, pyrophosphates); with anions of the oxo acids of the fourth main group (carbonates, hydrogencarbonates, hydroxide carbonates, carbonate hydrates, silicates, hexafluorosilicates, hexafluorosilicate hydrates, stannates); with anions of the oxo acids of the third main group (borates, polyborates, peroxoborates); with anions of the pseudohalides (thiocyanates, cyanates, cyanides); with anions of the oxo acids of the transition metals (chromates, chromites, molybdates, permanganate).

Preferably, the iron salts are iron(II) salts and/or iron(III) salts with organic anions from the group of the mono-, di-, oligo- and polycarboxylic acids (salts of formic acid (formates)), of acetic acid (acetates, acetate hydrates), of trifluoroacetic acid (trifluoroacetate hydrates), propionates, butyrates, valerates, caprylates, oleates, stearates, of oxalic acid (oxalates), of tartaric acid (tartrates), citric acid (citrates, basic citrates, citrate hydrates), benzoic acid (benzoates), salicylates, lactic acid (lactate, lactate hydrates), acrylic acid, maleic acid, succinic acid, of amino acids (glycine), of acidic hydroxo functions (phenoxides, etc.), para-phenolsulfonates, para-phenolsulfonate hydrates, acetylacetonate hydrates, tannates, dimethyldithiocarbamates, trifluoromethanesulfonate, alkylsulfonates and/or aralkylsulfonates.

Preferred iron salts are iron(II) and/or iron(III) borates, sulfates, sulfate hydrates, hydroxosulfate hydrates, mixed hydroxosulfate hydrates, oxysulfates, acetates, nitrates, fluorides, fluoride hydrates, chlorides, chloride hydrates, oxychlorides, bromides, iodides, iodide hydrates and/or carboxylic acid derivatives.

Preferably, the metal compounds are iron(II) and/or iron (III) acetates, chlorides, nitrates, sulfates, phosphinates, monoalkylphosphinates and/or alkylphosphonates.

The iron (component B)) mentioned in claim 1 is typically in the form of an iron salt or of an iron compound (component B1)). Preferred iron salts are iron(II) monoalkylphosphinates; these include iron(II) ethylphosphinate, iron(II) propylphosphinate, iron(II) butylphosphinate, iron(II) n-butylphosphinate, iron(II) sec-butylphosphinate, iron(II) hexylphosphinate and/or iron(II) octylphosphinate.

Preferred iron salts are iron(III) monoalkylphosphinates; these include iron(III) ethylphosphinate, iron(III) propylphosphinate, iron(III) butylphosphinate, iron(III) n-butylphosphinate, iron(III) sec-butylphosphinate, iron(III) hexylphosphinate and/or iron(III) octylphosphinate.

Preferred iron salts are iron(II) alkylphosphonates, which include iron(II) ethylphosphonate, iron(II) propylphosphonate, iron(II) butylphosphonate, iron(II) n-butylphosphonate, iron(II) sec-butylphosphonate, iron(II) hexylphosphonate and/or iron(II) octylphosphonate.

Preferred iron salts are iron(III) alkylphosphonates, which include iron(III) ethylphosphonate, iron(III) propylphosphonate, iron(III) butylphosphonate, iron(III) n-butylphosphonate, iron(III) sec-butylphosphonate, iron(III) hexylphosphonate and/or iron(III) octylphosphonate.

Preferred coprecipitated iron salts are iron(II) dialkylphosphinates, which include iron(II) bis(diethylphosphinate), iron(II) bis(dipropylphosphinate), iron(II) bis(butylethylphosphinate), iron(II) bis(n-butylethylphosphinate), iron(II) bis(sec-butylethylphosphinate), iron(II) bis(hexylethylphosphinate), iron(II) bis(dibutylphosphinate), iron(II) bis(hexylbutylphosphinate) and/or iron(II) bis(octylethylphosphinate).

Preferred iron salts are iron(III) dialkylphosphinates, which include iron(III) tris(diethylphosphinate), iron(III) tris(dipropylphosphinate), iron(III) tris(butylethylphosphinate), iron(III) tris(n-butylethylphosphinate), iron(III) tris(sec-butylethylphosphinate), iron(III) tris(hexylethylphosphinate), iron(III) tris(dibutylphosphinate), iron(III) tris(hexylbutylphosphinate) and/or iron(III) tris(octylethylphosphinate).

For the stability of the physical flame retardant mixture of the invention to separation in the course of agitation, small particle sizes are preferred.

Preference is given to median particle sizes $d_{50}$ of
dialkylphosphinic salt 0.01-1000 μm,
dialkylphosphinate salt/telomer salt coprecipitation 0.01-1000 μm,
flame retardant mixture of the invention 0.01-1000 μm.

Particular preference is given to median particle sizes $d_{50}$ of
dialkylphosphinic salt 0.1-90 μm,
dialkylphosphinate salt/telomer salt mixture 0.1-90 μm,
flame retardant mixture of the invention 0.1-90 μm.

In the processes according to the invention, it is possible to add any form of auxiliary that provides advantages in the production process or improves the product properties.

In the processes according to the invention, it is possible to mix in one or more synergists in one or more further process stages.

The flame-retardant polymer moulding composition preferably comprises
5% to 45% by weight of the flame retardant mixture of the invention,
5% to 90% by weight of polymer or mixtures thereof,
1% to 40% by weight of additives and
20% to 55% by weight of glass fibers.

The polymers preferably originate from the group of the thermoplastic polymers such as polyester, polystyrene or polyamide, and/or the thermoset polymers.

The polymers are preferably polymers of mono- and diolefins, for example polypropylene, polyisobutylene, polybutene-1, poly-4-methylpentene-1, polyisoprene or polybutadiene, and addition polymers of cycloolefins, for example of cyclopentene or norbornene; and also polyethylene (which may optionally be crosslinked), for example high-density polyethylene (HDPE), high-density, high-molecular-weight polyethylene (HDPE-HMW), high-density, ultrahigh-molecular-weight polyethylene (HDPE-UHMW), medium-density polyethylene (MDPE), low-density polyethylene (LDPE), linear low-density polyethylene (LLDPE), branched low-density polyethylene (BLDPE), and mixtures thereof.

The polymers are preferably copolymers of mono- and diolefins with one another or with other vinyl monomers, for example ethylene-propylene copolymers, linear low-density polyethylene (LLDPE) and mixtures thereof with low-density polyethylene (LDPE), propylene-butene-1 copolymers, propylene-isobutylene copolymers, ethylene-butene-1 copolymers, ethylene-hexene copolymers, ethylene-methylpentene copolymers, ethylene-heptene copolymers, ethylene-octene copolymers, propylene-butadiene copolymers, isobutylene-isoprene copolymers, ethylene-alkyl acrylate copolymers, ethylene-alkyl methacrylate copolymers, ethylene-vinyl acetate copolymers and copolymers thereof with carbon monoxide, or ethylene-acrylic acid copolymers and salts thereof (ionomers), and also terpolymers of ethylene with propylene and a diene such as hexadiene, dicyclopentadiene or ethylidenenorbornene; and also mixtures of such copolymers with one another, for example polypropylene/ethylene-propylene copolymers, LDPE/ethylene-vinyl acetate copolymers, LDPE/ethylene-acrylic acid copolymers, LLDPE/ethylene-vinyl acetate copolymers, LLDPE/ethylene-acrylic acid copolymers and alternating or random polyalkylene/carbon monoxide copolymers and mixtures thereof with other polymers, for example polyamides.

The polymers are preferably hydrocarbon resins (e.g. $C_5$-$C_9$), including hydrogenated modifications thereof (e.g. tackifier resins) and mixtures of polyalkylenes and starch.

The polymers are preferably polystyrene (Polystyrol 143E (BASF), poly(p-methylstyrene), poly(alpha-methylstyrene).

The polymers are preferably copolymers of styrene or alpha-methylstyrene with dienes or acrylic derivatives, for example styrene-butadiene, styrene-acrylonitrile, styrene-alkyl methacrylate, styrene-butadiene-alkyl acrylate and methacrylate, styrene-maleic anhydride, styrene-acrylonitrile-methyl acrylate; high impact resistance mixtures of styrene copolymers and another polymer, for example a polyacrylate, a diene polymer or an ethylene-propylene-diene terpolymer; and block copolymers of styrene, for example styrene-butadiene-styrene, styrene-isoprene-styrene, styrene-ethylene/butylene-styrene or styrene-ethylene/propylene-styrene.

The polymers are preferably graft copolymers of styrene or alpha-methylstyrene, for example styrene on polybutadiene, styrene on polybutadiene-styrene or polybutadiene-acrylonitrile copolymers, styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene, styrene and alkyl acrylates/alkyl methacrylates on polybutadiene, styrene and acrylonitrile on ethylene-propylene-diene terpolymers, styrene and acrylonitrile on polyalkyl acrylates or polyalkyl methacrylates, styrene and acrylonitrile on acrylate-butadiene copolymers, and mixtures thereof, such as are known, for example, as ABS, MBS, ASA or AES polymers.

The polymers are preferably halogenated polymers, for example polychloroprene, chlorine rubber, chlorinated and brominated copolymer of isobutylene-isoprene (halobutyl rubber), chlorinated or chlorosulfonated polyethylene, copolymers of ethylene and chlorinated ethylene, epichlorohydrin homo- and copolymers, especially polymers of halogenated vinyl compounds, for example polyvinyl chloride, polyvinylidene chloride, polyvinyl fluoride, polyvinylidene fluoride; and copolymers thereof, such as vinyl chloride-vinylidene chloride, vinyl chloride-vinyl acetate or vinylidene chloride-vinyl acetate.

The polymers are preferably polymers deriving from alpha-, beta-unsaturated acids and derivatives thereof, such as polyacrylates and polymethacrylates, butyl acrylate-impact-modified polymethyl methacrylates, polyacrylamides and polyacrylonitriles and copolymers of the cited monomers with one another or with other unsaturated monomers, for example acrylonitrile-butadiene copolymers, acrylonitrile-alkyl acrylate copolymers, acrylonitrile-alkoxyalkyl acrylate copolymers, acrylonitrile-vinyl halide copolymers or acrylonitrile-alkyl methacrylate-butadiene terpolymers.

The polymers are preferably polymers deriving from unsaturated alcohols and amines or from the acyl derivatives or acetals thereof, such as polyvinyl alcohol, polyvinyl acetate, stearate, benzoate or maleate, polyvinyl butyral, polyallyl phthalate, polyallylmelamine; and copolymers thereof with olefins.

The polymers are preferably homo- and copolymers of cyclic ethers, such as polyalkylene glycols, polyethylene oxide, polypropylene oxide or copolymers thereof with bisglycidyl ethers.

The polymers are preferably polyacetals, such as polyoxymethylene, and those polyoxymethylenes which comprise comonomers, for example ethylene oxide; polyacetals modified with thermoplastic polyurethanes, acrylates or MBS.

The polymers are preferably polyphenylene oxides and sulfides and mixtures thereof with styrene polymers or polyamides.

The polymers are preferably polyurethanes deriving from polyethers, polyesters and polybutadienes having both terminal hydroxyl groups and aliphatic or aromatic polyisocyanates, and the precursors thereof.

The polymers are preferably polyamides and copolyamides which derive from diamines and dicarboxylic acids and/or from aminocarboxylic acids or the corresponding lactams, such as nylon 2/12, nylon 4 (poly-4-aminobutyric acid, Nylon® 4, from DuPont), nylon 4/6 (poly(tetramethyleneadipamide)), Nylon® 4/6, from DuPont), nylon 6 (polycaprolactam, poly-6-aminohexanoic acid, Nylon® 6, from DuPont, Akulon® K122, from DSM; Zytel® 7301, from DuPont; Durethan® B 29, from Bayer), nylon 6/6 ((poly(N,N'-hexamethyleneadipamide), Nylon® 6/6, from DuPont, Zytel® 101, from DuPont; Durethan® A30, Durethan® AKV, Durethan® AM, from Bayer; Ultramid® A3, from BASF), nylon 6/9 (poly(hexamethylenenonanamide), Nylon® 6/9, from DuPont), nylon 6/10 (poly(hexamethylenesebacamide), Nylon® 6/10, from DuPont), nylon 6/12 (poly(hexamethylenedodecanediamide), Nylon® 6/12, from DuPont), nylon 6/66 (poly(hexamethyleneadipamide-co-caprolactam), Nylon® 6/66, from DuPont), nylon 7 (poly-7-aminoheptanoic acid, Nylon® 7, from DuPont), nylon 7,7 (polyheptamethylenepimelamide, Nylon® 7,7, from DuPont), nylon 8 (poly-8-aminooctanoic acid, Nylon® 8, from DuPont), nylon 8,8 (polyoctamethylenesuberamide, Nylon® 8,8, from DuPont), nylon 9 (poly-9-aminononanoic acid, Nylon® 9, from DuPont), nylon 9,9 (polynonamethyleneazelamide, Nylon® 9,9, from DuPont), nylon 10 (poly-10-aminodecanoic acid, Nylon® 10, from DuPont), nylon 10,9 (poly(decamethyleneazelamide), Nylon® 10,9, from DuPont), nylon 10,10 (polydecamethylenesebacamide, Nylon® 10,10, from DuPont), nylon 11 (poly-11-aminoundecanoic acid, Nylon® 11, from DuPont), nylon 12 (polylauryllactam, Nylon® 12, from DuPont, Grillamid® L20, from Ems Chemie), aromatic polyamides proceeding from m-xylene, diamine and adipic acid; polyamides prepared from hexamethylenediamine and iso- and/or terephthalic acid (polyhexamethyleneisophthalamide, polyhexamethyleneterephthalamide) and optionally an elastomer as a modifier, e.g. poly-2,4,4-trimethylhexamethyleneterephthalamide or poly-m-phenyleneisophthalamide. Block copolymers of the abovementioned polyamides with polyolefins, olefin copolymers, ionomers or chemically bonded or grafted elastomers; or with polyethers, for example with polyethylene glycol, polypropylene glycol or polytetramethylene glycol. In addition, EPDM- or ABS-modified polyamides or copolyamides; and polyamides condensed during processing ("RIM polyamide systems").

It is also possible to use aromatic polyamides such as PA4T, PA6T, PA9T, PA10T, PA11T and/or MXD6, amorphous polyamides such as 61/X and TPE-A "rigid" and "soft".

The polymers are preferably polyureas, polyimides, polyamidimides, polyetherimides, polyesterimides, polyhydantoins and polybenzimidazoles.

The polymers are preferably polyesters which derive from dicarboxylic acids and dialcohols and/or from hydroxycarboxylic acids or the corresponding lactones, such as polyethylene terephthalate, polybutylene terephthalate (Celanex® 2500, Celanex® 2002, from Celanese; Ultradur®, from BASF), poly-1,4-dimethylolcyclohexane terephthalate, polyhydroxybenzoates, and block polyether esters which derive from polyethers with hydroxyl end groups; and also polyesters modified with polycarbonates or MBS.

The polymers are preferably polycarbonates, polyester carbonates, polysulfones, polyether sulfones and polyether ketones.

The thermoset polymers are preferably formaldehyde polymers, epoxide polymers, melamine-phenolic resin polymers and/or polyurethanes.

The thermoset polymers are preferably epoxy resins.

The thermoset polymers are preferably epoxy resins which have been cured with resols, phenols, phenol derivatives and/or dicyandiamide, alcohols and amines.

The epoxy resins are preferably polyepoxide compounds.

The epoxy resins preferably originate from the group of the novolacs and the bisphenol A resins.

The thermoset polymer preferably comprises unsaturated polyester resins, dicyclopentadiene-modified unsaturated polyesters, polyphenylene ethers or butadiene polymers; block copolymers with a polybutadiene or polyisoprene block and a block of styrene or alpha-methylstyrene; block copolymers with a first polybutadiene block and a second polyethylene block or ethylene-propylene block, block copolymers with a first polyisoprene block and a second polyethylene or ethylene-propylene block.

The thermoset polymer is preferably one based on epoxidized vegetable oils (epoxidized soybean/linseed oil), acrylic acid derivatives (acrylic acid, crotonic acid, isocrotonic acid, methacrylic acid, cinnamic acid, maleic acid, fumaric acid, methylmethacrylic acid) and hydroxyalkyl acrylates and/or hydroxyalkyl alkacrylates (hydroxyethyl methacrylate, hydroxypropyl methacrylate, hydroxybutyl methacrylate, polyethylene glycol methacrylate).

The thermoset polymers preferably find use in electrical switch components, components in automobile construction, electrical engineering, electronics, printed circuit boards, prepregs, potting compounds for electronic components, in boat and rotor blade construction, in outdoor GFRP applications, domestic and sanitary applications, engineering materials and further products.

Preferably, the thermoset polymers comprise unsaturated polyester resins (UP resins) which derive from copolyesters of saturated and unsaturated polybasic starting materials, especially dicarboxylic acids or anhydrides thereof, with polyhydric alcohols, and vinyl compounds as crosslinking agents.

UP resins are cured by free-radical polymerization with initiators (e.g. peroxides) and accelerators.

Unsaturated polyesters may contain the ester group as a connecting element in the polymer chain.

Preferred unsaturated dicarboxylic acids and derivatives for preparation of the polyesters are maleic acid, maleic anhydride and fumaric acid, itaconic acid, citraconic acid, mesaconic acid. These may be blended with up to 200 mol %, based on the unsaturated acid components, of at least one aliphatic saturated or cycloaliphatic dicarboxylic acid.

Preferred saturated dicarboxylic acids are phthalic acid, isophthalic acid, terephthalic acid, dihydrophthalic acid, tetrahydrophthalic acid, hexahydrophthalic acid, endomethylenetetrahydrophthalic acid, adipic acid, succinic acid, sebacic acid, glutaric acid, methylglutaric acid, pimelic acid.

Preferred polyhydric, especially dihydric, optionally unsaturated alcohols are the customary alkanediols and oxaalkanediols having acyclic or cyclic groups.

Preferred unsaturated monomers copolymerizable with unsaturated polyesters preferably bear vinyl, vinylidene or allyl groups, for example preferably styrene, but also, for example, ring-alkylated or -alkenylated styrenes, where the alkyl groups may contain 1-4 carbon atoms, for example vinyltoluene, divinylbenzene, alpha-methylstyrene, tert-butylstyrene; vinyl esters of carboxylic acids having 2-6 carbon atoms, preferably vinyl acetate, vinyl propionate, vinyl benzoate; vinylpyridine, vinylnaphthalene, vinylcyclohexane, acrylic acid and methacrylic acid and/or esters thereof (preferably vinyl, allyl and methallyl esters) having 1-4 carbon atoms in the alcohol component, amides and nitriles thereof, maleic anhydride, maleic monoesters and diesters having 1-4 carbon atoms in the alcohol component, maleic mono- and -diamides or cyclic imides, such as butyl acrylate, methyl methacrylate, acrylonitrile, N-methylmaleimide or N-cyclohexylmaleimide; allyl compounds such as allylbenzene and allyl esters such as allyl acetate, diallyl phthalate, diallyl isophthalate, diallyl fumarate, allyl carbonates, diallyl phthalates, diallyl carbonates, triallyl phosphate and triallyl cyanurate.

A preferred vinyl compound for crosslinking is styrene.

Preferred unsaturated polyesters may bear the ester group in the side chain as well, for example polyacrylic esters and polymethacrylic esters.

Preferred hardener systems are peroxides and accelerators.

Preferred accelerators are metal coinitiators and aromatic amines and/or UV light and photosensitizers, for example benzoin ethers and azo catalysts such as azoisobutyronitrile, mercaptans such as lauryl mercaptan, bis(2-ethylhexyl) sulfide and bis(2-mercaptoethyl) sulfide.

In one process for preparing flame-retardant copolymers, at least one ethylenically unsaturated dicarboxylic anhydride derived from at least one $C_4$-$C_8$-dicarboxylic acid, at least one vinylaromatic compound and at least one polyol are copolymerized and then reacted with the flame retardant mixtures of the invention.

Usable with preference are dicyclopentadiene-modified unsaturated polyesters which are obtained by reaction of dicyclopentadiene, maleic anhydride, water, saturated alcohol and optionally a further polybasic acid. The polyester is crosslinked with a free-radically polymerizable monomer such as styrene to give the resin.

The polymers are preferably crosslinked polymers which derive from aldehydes and from phenols, urea or melamine, such as phenol-formaldehyde, urea-formaldehyde and melamine-formaldehyde resins.

The polymers preferably comprise crosslinkable acrylic resins which derive from substituted acrylic esters, for example from epoxy acrylates, urethane acrylates or polyester acrylates.

The polymers are preferably alkyd resins, polyester resins and acrylate resins which have been crosslinked with melamine resins, urea resins, isocyanates, isocyanurates, polyisocyanates or epoxy resins.

The polymers are preferably crosslinked epoxy resins which derive from aliphatic, cycloaliphatic, heterocyclic or aromatic glycidyl compounds, for example products of bisphenol A diglycidyl ethers, bisphenol F diglycidyl ethers, which are crosslinked by means of customary hardeners, for example anhydrides or amines, with or without accelerators.

Preferred thermosets are polymers from the class of the cyanate esters, cyanate ester/bismaleimide copolymer, bismaleimide/triazine epoxy blends and butadiene polymers.

Preferred butadiene polymers are block copolymers containing 70%-95% by weight of one or more monovinyl-substituted aromatic hydrocarbon compounds having 8-18 carbon atoms and 30%-5% by weight of one or more conjugated dienes having 4-12 carbon atoms and optionally crosslinkers.

Preferably, the flame retardant mixtures of the invention are also used in resin systems consisting of polybutadiene resins or polyisoprene resins or mixtures thereof with unsaturated butadiene- or isoprene-containing polymers which can take part in crosslinking.

Preferably, the polymers are crosslinked epoxy resins which derive from aliphatic, cycloaliphatic, heterocyclic or aromatic glycidyl compounds, for example from bisphenol A diglycidyl ethers, bisphenol F diglycidyl ethers, which are crosslinked by means of customary hardeners and/or accelerators.

Suitable glycidyl compounds are bisphenol A diglycidyl esters, bisphenol F diglycidyl esters, polyglycidyl esters of phenol formaldehyde resins and cresol-formaldehyde resins, polyglycidyl esters of phthalic acid, isophthalic acid and terephthalic acid, and of trimellitic acid, N-glycidyl compounds of aromatic amines and heterocyclic nitrogen bases, and di- and polyglycidyl compounds of polyhydric aliphatic alcohols.

Suitable hardeners are aliphatic, cycloaliphatic, aromatic and heterocyclic amines or polyamines, such as ethylenediamine, diethylenetriamine, triethylenetetramine, propane-1,3-diamine, hexamethylenediamine, aminoethylpiperazine, isophoronediamine, polyamidoamine, diaminodiphenyl-methane, diaminodiphenyl ether, diaminodiphenyl sulfone, aniline-formaldehyde resins, 2,2,4-trimethylhexane-1,6-diamine, m-xylylenediamine, bis(4-aminocyclohexyl)methane, 2,2-bis(4-aminocyclohexyl)propane, 3-aminomethyl-3,5,5-trimethylcyclohexylamine (isophoronediamine), polyamidoamines, cyanoguanidine and dicyandiamide, and likewise polybasic acids or anhydrides thereof, for example phthalic anhydride, maleic anhydride, tetrahydrophthalic anhydride, methyltetrahydrophthalic anhydride, hexahydrophthalic anhydride and methylhexahydrophthalic anhydride, and also phenols, for example phenol-novolac resin, cresol-novolac resin, dicyclopentadiene-phenol adduct resin, phenol aralkyl resin, cresolaralkyl resin, naphtholaralkyl resin, biphenol-modified phenolaralkyl resin, phenol-trimethylolmethane resin, tetraphenylolethane resin, naphthol-novolac resin, naphthol-phenol cocondensate resin, naphthol-cresol cocondensate resin, biphenol-modified phenol resin and aminotriazine-modified phenol resin. All hardeners can be used alone or in combination with one another.

Suitable catalysts or accelerators for the crosslinking in the polymerization are tertiary amines, benzyldimethylamine, N-alkylpyridines, imidazole, 1-methylimidazole, 2-methylimidazole, 2-ethyl-4-methylimidazole, 2-ethyl-4- methylimidazole, 2-phenylimidazole, 2-heptadecylimidazole, metal salts of organic acids, Lewis acids and amine complex salts.

The polymers are preferably crosslinked polymers which derive from aldehydes on the one hand, and phenols, urea or melamine on the other hand, such as phenol-formaldehyde, urea-formaldehyde and melamine-formaldehyde resins. The polymers preferably comprise crosslinkable acrylic resins which derive from substituted acrylic esters, for example from epoxy acrylates, urethane acrylates or polyester acrylates.

Preferred polyester polyols are obtained by polycondensation of a polyalcohol such as ethylene glycol, diethylene glycol, propylene glycol, 1,4-butanediol, 1,5-pentanediol, methylpentanediol, 1,6-hexanediol, trimethylolpropane, glycerol, pentaerythritol, diglycerol, glucose and/or sorbitol, with a dibasic acid such as oxalic acid, malonic acid, succinic acid, tartaric acid, adipic acid, sebacic acid, maleic acid, fumaric acid, phthalic acid and/or terephthalic acid. These polyester polyols can be used alone or in combination.

Suitable polyisocyanates are aromatic, alicyclic and/or aliphatic polyisocyanates having not fewer than two isocyanate groups and mixtures thereof. Preference is given to aromatic polyisocyanates such as tolyl diisocyanate, methylene diphenyl diisocyanate, naphthylene diisocyanate, xylylene diisocyanate, tris(4-isocyanatophenyl)methane and polymethylenepolyphenylene diisocyanates; alicyclic polyisocyanates such as methylenediphenyl diisocyanate, tolyl diisocyanate; aliphatic polyisocyanates and hexamethylene diisocyanate, isophorone diisocyanate, dimeryl diisocyanate, 1,1-methylenebis(4-isocyanatocyclohexane-4,4'-diisocyanatodicyclohexylmethane isomer mixture, 1,4-cyclohexyl diisocyanate, Desmodur® products (Bayer) and lysine diisocyanate and mixtures thereof.

Suitable polyisocyanates are modified products which are obtained by reaction of polyisocyanate with polyol, urea, carbodiimide and/or biuret.

The polymers are preferably unsaturated polyester resins which derive from copolyesters of saturated and unsaturated dicarboxylic acids with polyhydric alcohols, and vinyl compounds as crosslinking agents, and also the halogenated, flame-retardant modifications thereof.

The polymers preferably comprise crosslinkable acrylic resins which derive from substituted acrylic esters, for example from epoxy acrylates, urethane acrylates or polyester acrylates.

The polymers are preferably mixtures (polyblends) of the abovementioned polymers, for example PP/EPDM (polypropylene/ethylene-propylene-diene rubber), polyamide/EPDM or ABS (polyamide/ethylene-propylene-diene rubber or acrylonitrile-butadiene-styrene), PVC/EVA (polyvinyl chloride/ethylene-vinyl acetate), PVC/ABS (polyvinyl chloride/acrylonitrile-butadiene-styrene), PVC/MBS (polyvinyl chloride/methacrylate-butadiene-styrene), PC/ABS (polycarbonate/acrylonitrile-butadiene-styrene), PBTP/ABS (polybutylene terephthalate/acrylonitrile-butadiene-styrene), PC/ASA (polycarbonate/acrylic ester-styrene-acrylonitrile), PC/PBT (polycarbonate/polybutylene terephthalate), PVC/CPE (polyvinyl chloride/chlorinated polyethylene), PVC/acrylate (polyvinyl chloride/acrylates, POM/thermoplastic PUR (polyoxymethylene/thermoplastic polyurethane), PC/thermoplastic PUR (polycarbonate/thermoplastic polyurethane), POM/acrylate (polyoxymethylene/acrylate), POM/MBS (polyoxymethylene/methacrylate-butadiene-styrene), PPO/HIPS (polyphenylene oxide/high-impact polystyrene), PPO/PA 6,6 (polyphenylene oxide/nylon 6,6) and copolymers, PA/HDPE (polyamide/high-density polyethylene), PA/PP (polyamide/polyethylene), PA/PPO (polyamide/polyphenylene oxide), PBT/PC/ABS (polybutylene terephthalate/polycarbonate/acrylonitrile-butadiene-styrene) and/or PBT/PET/PC (polybutylene terephthalate/polyethylene terephthalate/polycarbonate).

The molding produced is preferably of rectangular shape with a regular or irregular base, or of cubic shape, cuboidal shape, cushion shape or prism shape.

The flame retardant mixtures of the invention can also be used in elastomers, for instance nitrile rubber, nitrile rubber with carboxyl groups and carboxy-terminated butadiene-acrylonitrile, chloroprene rubber, butadiene rubber, acrylonitrile-butadiene rubber, styrene-butadiene rubber, butadiene rubber with acrylic resin and thermoplastic polyimide, urethane-modified copolyester polymer and other elastomers.

Preferred further additives in the flame retardant mixtures of the invention are from the group of the carbodiimides and/or (poly)isocyanates.

Preferred further additives come from the group of the sterically hindered phenols (e.g. Hostanox® OSP 1), sterically hindered amines and light stabilizers (e.g. Chimasorb® 944, Hostavin® products), phosphonites and antioxidants (e.g. Sandostab® P-EPQ from Clariant) and separating agents (Licomont® products from Clariant).

Preferred fillers in the flame retardant mixtures of the invention are oxygen compounds of silicon, magnesium compounds, e.g. metal carbonates of metals of the second main group of the Periodic Table, magnesium oxide, magnesium hydroxide, hydrotalcites, dihydrotalcite, magnesium carbonates or magnesium calcium carbonates, calcium compounds, e.g. calcium hydroxide, calcium oxide, hydrocalumite, aluminum compounds, e.g. aluminum oxide, aluminum hydroxide, boehmite, gibbsite or aluminum phosphate, red phosphorus, zinc compounds and/or aluminum compounds.

Preferred further fillers are glass beads.

Glass fibers are preferably used as reinforcing materials.

Compounding units usable in accordance with the invention are multizone screw extruders having three-zone screws and/or short compression screws.

Compounding units usable in accordance with the invention are also co-kneaders, for example from Coperion Buss Compounding Systems, Pratteln, Switzerland, e.g. MDK/E46-11D, and/or laboratory kneaders (MDK 46 from Buss, Switzerland with L=11D).

Compounding units usable in accordance with the invention are twin-screw extruders, for example from Coperion Werner & Pfleiderer GmbH & Co. KG, Stuttgart (ZSK 25, ZSK 30, ZSK 40, ZSK 58, ZSK MEGAcompounder 40, 50, 58, 70, 92, 119, 177, 250, 320, 350, 380) and/or from Berstorff GmbH, Hanover, Leistritz Extrusionstechnik GmbH, Nuremberg.

Compounding units usable in accordance with the invention are ring extruders, for example from 3+ Extruder GmbH, Laufen, with a ring of three to twelve small screws which rotate about a static core, and/or planetary gear extruders, for example from Entex, Bochum, and/or vented extruders and/or cascade extruders and/or Maillefer screws.

Compounding units usable in accordance with the invention are compounders with a contrarotatory twin screw, for example Compex 37 and 70 models from Krauss-Maffei Berstorff.

Inventive effective screw lengths (L) in the case of single-shaft extruders or single-screw extruders are 20 to 40D, in the case of twin-shaft extruders 8 to 48D, and in the case of multizone screw extruders, for example, 25D with intake zone (L=10D), transition zone (L=6D) and ejection zone (L=9D).

The invention additionally relates to the use of the inventive flame retardant mixture as claimed in one or more of claims 1 to 18 in or for plug connectors, current-bearing components in power distributors (residual current protection), circuit boards, potting compounds, plug connectors, circuit breakers, lamp housings, LED housings, capacitor housings, coil elements and ventilators, grounding contacts, plugs, in/on printed circuit boards, housings for plugs, cables, flexible circuit boards, charging cables for mobile phones, motor covers, textile coatings and other products.

These include moldings in the form of components for the electrics/electronics sector, especially for parts of printed circuit boards, housings, films, wires, switches, distributors, relays, resistors, capacitors, coils, lamps, diodes, LEDs, transistors, connectors, regulators, memory elements and sensors, in the form of large-area components, especially of housing components for switchgear cabinets and in the form of components of complicated configuration with demanding geometry.

Preferably, in the case of such moldings, the wall thickness is less than 0.5 mm, but may also be more than 1.5 mm (up to 10 mm). Particularly suitable thicknesses are less than 1.5 mm, more preferably less than 1 mm and especially preferably less than 0.5 mm.

The flame retardant mixture of the invention is preferably used with glass fibers having an arithmetic mean length of 100 to 220 µm for production of flame-retardant polyamide molding compounds and/or moldings, wherein the production process for the polyamide molding compound or the molding is adjusted such that the glass fibers in the resulting polyamide molding compound or the molding have an arithmetic mean length in the range from 100 to 220 µm, and wherein the polyamide molding compound or the molding preferably has an IEC 60695-11-10 (UL94) classification of V-0.

Production, processing and testing of flame-retardant polymer molding compounds and polymer moldings The flame retardant components are mixed with the polymer pellets and any additives and incorporated via the side intake of a twin-screw extruder (Leistritz ZSE 27/44D) at temperatures of 230 to 260° C. (glass fiber-reinforced PBT), into PA 6,6 at 260-310° C. and into PA 6 at 250-275° C. The glass fibers were added via a second side intake. The homogenized polymer strand was drawn off, cooled in a water bath and then pelletized to give flame-retardant polymer molding compounds.

After sufficient drying, the molding compositions were processed on an injection molding machine (model: Arburg 320 C Allrounder) at melt temperatures of 240 to 300° C. to give flame-retardant polymer moldings. These can be used as test specimens and tested for flame retardancy and classified by the UL 94 test (Underwriter Laboratories).

Determination of the processing window of the PA-GF30 compound in the isothermal DSC test:

In accordance with the general method above, flame-retardant polymer molding compounds and flame-retardant polymer moldings are produced. The composition is 49.7% by weight of polyamide (Ultramid® A 27 E 01 from BASF SE), 30% by weight of glass fibers (PPG HP 3610 EC10 glass fibers from PPG), 12.6% by weight of flame retardant mixture of the invention corresponding to the examples, 6.6% by weight of melamine polyphosphate (MPP) (Melapur® 200/70 from BASF), 0.8% by weight of zinc borate (®Firebrake 500 from Rio Tinto Minerals), 0.3% by weight of wax (Licowax® E Gran from Clariant).

Since the lower limit of the processing window is unaffected, the measure used for determining the processing window is the breakdown of the flame-retardant polymer molding compound at the upper limit. This is done using the weight loss at a defined temperature.

DSC (differential thermal analysis) under air after a delay time of 60 min is used to determine the weight loss at 330° C. in % by weight.

The free flow of the flame retardant mixture of the invention is determined according to Pfrengle (DIN ISO 4324 Surface active agents; powders and granules; measurement of the angle of repose, December 1983, Beuth Verlag Berlin).

The aforementioned free flow is determined by the determination of the height of the cone of a powder or granular material or the ratio of cone radius to cone height. The cone is produced by pouring a specific amount of the substance to be examined through a specific funnel in a defined apparatus. The defined cone radius is produced by pouring the cone until the product flows over a circular plate raised from the base. The radius of the plate is fixed. The funnel has an internal diameter of 10 mm. The plate has a radius of 50 mm. 5 determinations are conducted and averaged. The height is measured in millimeters with a scale proceeding from the plate up to the vertex of the cone. The ratio of cone radius (50 mm) to cone height is calculated from the mean value.

Using a flame retardant mixture according to the prior art, cone of repose heights of 29.9 to 49.9 mm, corresponding to a span of 20 mm, were determined, and ratios of radius to height (=cot alpha) of 1.67 to 1.00, corresponding to a span of 0.67.

Test specimens of each mixture were used to determine the UL 94 fire class (Underwriter Laboratories) on specimens of thickness 1.5 mm.

The UL 94 fire classifications are as follows:
V-0 afterflame time never longer than 10 sec, total of afterflame times for 10 flame applications not more than 50 sec, no flaming drops, no complete consumption of the specimen, afterglow time for specimens never longer than 30 sec after end of flame application
V-1 afterflame time never longer than 30 sec after end of flame application, total of afterflame times for 10 flame applications not more than 250 sec, afterglow time for specimens never longer than 60 sec after end of flame application, other criteria as for V-0
V-2 cotton indicator ignited by flaming drops, other criteria as for V-1
Not classifiable (ncl): does not comply with fire classification V-2.

In the examples which follow, the thermal stability in each case is determined using the flame retardant mixture of the invention, and the processing window using the flame-retardant polymeric molding compound.

Production, processing and testing of flame-retardant polymer molding compounds and polymer moldings The flame retardant components are mixed with the polymer pellets and any additives and incorporated via the side intake of a twin-screw extruder (Leistritz ZSE 27/44D) at temperatures of 230 to 260° C. (glass fiber-reinforced PBT), into PA 6,6 at 260-310° C. and into PA 6 at 250-275° C. The glass fibers were added via a second side intake. The homogenized polymer strand was drawn off, cooled in a water bath and then pelletized to give flame-retardant polymer molding compounds.

After sufficient drying, the molding compositions are processed on an injection molding machine (model: Arburg 320 C Allrounder) at melt temperatures of 240 to 300° C. to give flame-retardant polymer moldings. They can be used as test specimens and tested for flame retardancy and classified by the UL 94 test (Underwriter Laboratories).

Determination of the Processing Window of the PA-GF30 Compound in the Isothermal DSC Test In accordance with the general method, flame-retardant polymer molding compounds and flame-retardant polymer moldings are produced. The composition is 49.7% by weight of polyamide (Ultramid® A 27 E 01 from BASF SE), 30% by weight of glass fibers (PPG HP 3610 EC10 glass fibers from PPG), 12.6% by weight of flame retardant mixture of the invention corresponding to the examples, 6.6% by weight of MPP (Melapur® 200/70 from BASF, 0.8% by weight of zinc borate (Firebrake 500 from Rio Tinto Minerals), 0.3% by weight of wax (Licowax® E Gran from Clariant).

Since the lower limit of the processing window is unaffected, the measure used for the processing window is the breakdown of the flame-retardant polymer molding compound at the upper limit. This is done using the weight loss at a defined temperature.

DSC (differential thermal analysis) under air after a delay time of 60 min is used to determine the weight loss at 330° C. in % by weight.

EXAMPLE 1 (COMPARATIVE)

Aluminum diethylphosphinate with no telomer or iron shows the thermal stability and processing window listed in table 2.

EXAMPLES 2 AND 4

Aluminum diethylphosphinates with no telomer are mixed with iron tris(diethylphosphinate) in a Lödige plowshare mixer to give physical mixtures, by mixing for about 15 min until homogeneity is attained. The flame retardant mixtures of the invention contain 20 or 1000 ppm of iron.

The thermal stability and the processing window (see table 2 for both) are superior to pure aluminum diethylphosphinate (table 2, comparative example 1). The thermal stability is determined using the flame retardant mixtures of the invention, and the processing window using the flame-retardant polymeric molding compounds.

EXAMPLES 3 AND 5

Aluminum diethylphosphinate with no telomer is mixed with iron tris(dipropylphosphinate) in a Lödige plowshare mixer to give physical mixtures, by mixing for about 15 min until homogeneity is attained. The flame retardant mixtures of the invention contain 50 or 13 413 ppm of iron.

The thermal stability and the processing window (see table 2 for both) are superior to pure aluminum diethylphosphinate (table 2, comparative example 1). The thermal stability is determined using the flame retardant mixtures of the invention, and the processing window using the flame-retardant polymeric molding compounds.

EXAMPLES 6 TO 17

Aluminum diethylphosphinate containing n-butyl ethylphosphinate or sec-butyl ethylphosphinate or ethyl hexyl phosphinate in ionically bound form is mixed with iron tris(diethylphosphinate) in a Lödige plowshare mixer for about 15 min until homogeneity is attained. The amounts used are described in table 3, and the composition of the flame retardant mixtures of the invention in table 4. The thermal stability and the processing window (see table 4 for both) are superior to pure aluminum diethylphosphinate (table 2, comparative example 1). The thermal stability is determined using the flame retardant mixtures of the invention, and the processing window using the flame-retardant polymeric molding compound.

EXAMPLES 18 TO 19

Aluminum diethylphosphinate containing n-butyl ethylphosphinate in ionically bound form is mixed with iron tris(dipropylphosphinate) in a Lödige plowshare mixer for about 15 min until homogeneity is attained. The amounts used are described in table 3, and the composition of the flame retardant mixtures of the invention in table 4.

The thermal stability and the processing window (see table 4 for both) are superior to pure aluminum diethylphosphinate (table 2, comparative example 1). The thermal stability is determined using the flame retardant mixtures of the invention, and the processing window using the flame-retardant polymeric molding compound.

EXAMPLES 20 TO 35

Aluminum diethylphosphinates containing n-butyl ethylphosphinate, sec-butyl ethylphosphinate or ethyl n-hexyl phosphinate in ionically bound form are mixed with iron additions in the amounts specified in tables 5 and 7 in a Lödige plowshare mixer for about 15 min until homogeneity is attained. The flame retardant mixtures of the invention contain the amounts of n-butyl ethylphosphinate, sec-butyl ethylphosphinate or ethyl n-hexylphosphinate and iron specified in tables 6 and 8.

The thermal stability and the processing window (see tables 6 and 8 for both) are superior to pure aluminum diethylphosphinate (table 2, comparative example 1). The thermal stability is determined using the flame retardant mixtures of the invention, and the processing window using the flame-retardant polymeric molding compound.

EXAMPLES 36 AND 37

Aluminum diethylphosphinate containing n-butyl ethylphosphinate in coprecipitated form is mixed with iron tris(diethylphosphinate) in a Lödige plowshare mixer for about 15 min until homogeneity is attained. The amounts used are described in table 7, and the composition of the flame retardant mixtures of the invention in table 8.

The thermal stability and the processing window (see table 8 for both) are superior to pure aluminum diethylphosphinate (table 2, comparative example 1). The thermal stability is determined using the flame retardant mixtures of the invention, and the processing window using the flame-retardant polymeric molding compound.

EXAMPLE 38

Aluminum diethylphosphinate containing sec-butyl ethylphosphinate in ionically bound form is mixed first with aluminum tris(n-butylethylphosphinate) and then with iron tris(diethylphosphinate) in a Lödige plowshare mixer to give a physical mixture by mixing for about 15 min until homogeneity is attained. The flame retardant mixture of the invention contains 52 ppm of iron.

The thermal stability and the processing window (see table 8 for both) are superior to pure aluminum diethylphosphinate (table 2, comparative example 1). The thermal stability is determined using the flame retardant mixture of the invention, and the processing window using the flame-retardant polymeric molding compound.

TABLE 1

Amounts used in the flame retardant mixtures [g]

| | Example | 1 comp. | 2 | 3 | 4 | 5 | 6 | 7 | 8 | 9 | 10 |
|---|---|---|---|---|---|---|---|---|---|---|---|
| | Aluminum diethylphosphinate [g] | 1000.00 | 999.85 | 999.55 | 992.5 | 879.0 | 999.85 | 899.0 | 999.75 | 992.5 | 999.75 |
| Inventive iron additions [g] | Iron tris(diethylphosphinate) | | 0.15 | | 7.5 | | 0.15 | 101 | | 7.5 | |
| | Iron tris(dipropylphosphinate) | | | 0.45 | | 121 | | | | | |
| | Iron di(dibutylphosphinate) | | | | | | | | | | |
| | Iron tris(ethylphosphinate) | | | | | | | | | | |
| | Iron tris(hexylphosphinate)/Fe((C$_6$H$_{13}$)PO$_2$H)$_3$ | | | | | | | | | | |
| | Diiron tris(ethylphosphonate)/Fe$_2$(C$_2$H$_5$PO$_3$)$_3$ | | | | | | | | | | |
| | Iron tris(n-butylethylphosphinate) | | | | | | | | | | |
| | Iron phosphite/Fe$_2$(HPO$_3$)$_3$ | | | | | | | | | | |
| | Iron(III) phosphate/FePO$_4$ | | | | | | | | | | |
| | Iron(II) phosphate/Fe$_3$(PO$_4$)$_2$ | | | | | | | | | | |
| Telomers [g] | Aluminum n-butylethylphosphinate | | | | | | | | 0.25 | | 0.25 |

TABLE 2

Analysis of the flame retardant mixtures, thermal stability and processing window

| | Example | 1 comp. | 2 | 3 | 4 | 5 | 6 | 7 | 8 | 9 | 10 |
|---|---|---|---|---|---|---|---|---|---|---|---|
| | Additions [% by wt.] | 0 | 0.02 | 0.05 | 0.76 | 14 | 0.02 | 11 | 0.03 | 0.76 | 0.03 |
| Telomer content [P %] | n-Butyl ethylphosphinate (as Al salt) | — | — | — | — | — | 0.05 | 0.05 | 0.5 | 0.5 | 10 |
| | sec-Butyl ethylphosphinate (as Al salt) | — | — | — | — | — | — | — | — | — | — |
| | Ethyl n-hexylphosphinate (as Al salt) | — | — | — | — | — | — | — | — | — | — |
| | Fe content [ppm] | 0 | 20 | 50 | 1000 | 13 413 | 20 | 13 413 | 33 | 1000 | 33 |
| | Therm. stability [° C.] | 325 | 335 | 366 | 376 | 359 | 337 | 350 | 356 | 375 | 375 |
| | Processing window [%] | 8 | 5 | 4.3 | 4.2 | 5.5 | 5 | 5.4 | 3.7 | 3.5 | 5.1 |

35

TABLE 3

Amounts used in the flame retardant mixtures [g]

| | Example | 11 | 12 | 13 | 14 | 15 | 16 | 17 | 18 | 19 | 20 |
|---|---|---|---|---|---|---|---|---|---|---|---|
| | Aluminum diethylphosphinate [g] | 992.5 | 999.85 | 899.0 | 999.85 | 992.5 | 999.85 | 992.5 | 999.7 | 991.0 | 999.85 |
| Inventive iron additions [g] | Iron tris(diethylphosphinate) | 7.5 | 0.15 | 101 | 0.15 | 7.5 | 0.15 | 7.5 | | | |
| | Iron tris(dipropylphosphinate) | | | | | | | | 0.3 | 9 | |
| | Iron di(dibutylphosphinate) | | | | | | | | | | 0.15 |
| | Iron tris(ethylphosphinate) | | | | | | | | | | |
| | Iron tris(hexylphosphinate)/Fe((C$_6$H$_{13}$)PO$_2$H)$_3$ | | | | | | | | | | |
| | Diiron tris(ethylphosphonate)/Fe(C$_2$H$_5$PO$_3$)$_3$ | | | | | | | | | | |
| | Iron tris(n-butylethylphosphinate) | | | | | | | | | | |
| | Iron phosphite/Fe$_2$(HPO$_3$)$_3$ | | | | | | | | | | |
| | Iron(III) phosphate/FePO$_4$ | | | | | | | | | | |
| | Iron(II) phosphate/Fe$_3$(PO$_4$)$_2$ | | | | | | | | | | |
| Telomers [g] | Aluminum n-butylethylphosphinate | | | | | | | | | | |

TABLE 4

Analysis of the flame retardant mixtures, thermal stability and processing window

| | Example | 11 | 12 | 13 | 14 | 15 | 16 | 17 | 18 | 19 | 20 |
|---|---|---|---|---|---|---|---|---|---|---|---|
| | Additions [% by wt.] | 0.76 | 0.02 | 11 | 0.02 | 0.76 | 0.06 | 0.76 | 0.03 | 0.91 | 0.02 |
| Telomer content | n-Butyl ethylphosphinate (as Al salt) | 10 | 20 | 20 | — | — | — | — | 0.05 | 10 | |

TABLE 4-continued

Analysis of the flame retardant mixtures, thermal stability and processing window

| | Example | 11 | 12 | 13 | 14 | 15 | 16 | 17 | 18 | 19 | 20 |
|---|---|---|---|---|---|---|---|---|---|---|---|
| [P %] | sec-Butyl ethylphosphinate (as Al salt) | — | — | — | 0.1 | 5 | — | — | — | — | 0.05 |
| | Ethyl n-hexylphosphinate (as Al salt) | — | — | — | — | — | 0.1 | 10 | — | — | — |
| | Fe content [ppm] | 1000 | 20 | 13 413 | 20 | 1000 | 20 | 1000 | 33 | 1000 | 20 |
| | Therm. stability [° C.] | 375 | 334 | 359 | 339 | 369 | 336 | 368 | 344 | 374 | 338 |
| | Processing window [%] | 4.9 | 5.1 | 5.5 | 5.1 | 4.3 | 5.6 | 4.4 | 5.3 | 4.5 | 5.6 |

TABLE 5

Amounts used in the flame retardant mixtures [g]

| | Example | 21 | 22 | 23 | 24 | 25 | 26 | 27 | 28 | 29 | 30 |
|---|---|---|---|---|---|---|---|---|---|---|---|
| | Aluminum diethylphosphinate [g] | 992.5 | 999.85 | 994 | 999.7 | 995.5 | 999.84 | 992.2 | 999.8 | 991 | 999.87 |
| Inventive iron additions [g] | Iron tris(diethylphosphinate) | | | | | | | | | | |
| | Iron tris(dipropylphosphinate) | | | | | | | | | | |
| | Iron di(dibutylphosphinate) | 7.5 | | | | | | | | | |
| | Iron tris(ethylphosphinate) | | | 0.15 | 6 | | | | | | |
| | Iron tris(hexylphosphinate)/Fe((C$_6$H$_{13}$)PO$_2$H)$_3$ | | | | | 0.3 | 4.5 | | | | |
| | Diiron tris(ethylphosphonate)/Fe$_2$(C$_2$H$_5$PO$_3$)$_3$ | | | | | | | 0.16 | 7.8 | | |
| | Iron tris(n-butylethylphosphinate) | | | | | | | | | 0.2 | 9 |
| | Iron phosphite/Fe$_2$(HPO$_3$)$_3$ | | | | | | | | | | 0.13 |
| | Iron(III) phosphate/FePO$_4$ | | | | | | | | | | |
| | Iron(II) phosphate/Fe$_3$(PO$_4$)$_2$ | | | | | | | | | | |
| Telomers [g] | Aluminum n-butylethylphosphinate | | | | | | | | | | |

TABLE 6

Analysis of the flame retardant mixtures, thermal stability and processing window

| | Example | 21 | 22 | 23 | 24 | 25 | 26 | 27 | 28 | 29 | 30 |
|---|---|---|---|---|---|---|---|---|---|---|---|
| Telomer content [P %] | Additions [% by wt.] | 0.76 | 0.02 | 0.60 | 0.03 | 0.45 | 0.02 | 0.79 | 0.02 | 0.91 | 0.01 |
| | n-Butyl ethylphosphinate (as Al salt) | | 0.05 | 10 | | | | | | | 0.05 |
| | sec-Butyl ethylphosphinate (as Al salt) | 10 | | | | | 0.05 | 10 | 0.05 | 10 | |
| | Ethyl n-hexylphosphinate (as Al salt) | | | | 0.05 | 5 | | | | | |
| | Fe content [ppm] | 1021 | 25 | 1000 | 33 | 499 | 21 | 1000 | 22 | 999 | 21 |
| | Therm. stability [° C.] | 372 | 338 | 368 | 346 | 373 | 338 | 373 | 335 | 370 | 337 |
| | Processing window [%] | 4.7 | 5.9 | 6.1 | 5.6 | 4.2 | 6 | 4.1 | 4.9 | 4.3 | 5.5 |

TABLE 7

Amounts used in the flame retardant mixtures [g]

| | Example | 31 | 32 | 33 | 34 | 35 | 36 | 37 | 38 |
|---|---|---|---|---|---|---|---|---|---|
| | Aluminum diethylphosphinate [g] | 993.7 | 999.94 | 997.3 | 999.85 | 993.6 | 999.85 | 992.5 | 981.61 |
| Inventive iron additives [g] | Iron tris(diethylphosphinate) | | | | | | 0.15 | 7.5 | 0.39 |
| | Iron tris(dipropylphosphinate) | | | | | | | | |
| | Iron di(dibutylphosphinate) | | | | | | | | |
| | Iron tris(ethylphosphinate) | | | | | | | | |
| | Iron tris(hexylphosphinate)/Fe((C$_6$H$_{13}$)PO$_2$H)$_3$ | | | | | | | | |
| | Diiron tris(ethylphosphonate)/Fe$_2$(C$_2$H$_5$PO$_3$)$_3$ | | | | | | | | |
| | Iron tris(n-butylethylphosphinate) | | | | | | | | |
| | Iron phosphite/Fe$_2$(HPO$_3$)$_3$ | 6.3 | | | | | | | |

TABLE 7-continued

| | Amounts used in the flame retardant mixtures [g] | | | | | | | |
|---|---|---|---|---|---|---|---|---|
| | Example | 31 | 32 | 33 | 34 | 35 | 36 | 37 | 38 |
| | Iron(III) phosphate/FePO$_4$ | | 0.06 | 2.7 | | | | | |
| | Iron(II) phosphate/Fe$_3$(PO$_4$)$_2$ | | | | 0.15 | 6.4 | | | |
| Telomers [g] | Aluminum n-butylethylphosphinate | | | | | | | | 18 |

TABLE 8

| | Analysis of the flame retardant mixtures, thermal stability and processing window | | | | | | | |
|---|---|---|---|---|---|---|---|---|
| | Example | 31 | 32 | 33 | 34 | 35 | 36 | 37 | 38 |
| | Additions [% by wt.] | 0.63 | 0.01 | 0.27 | 0.02 | 0.64 | 0.02 | 0.76 | |
| Telomer content [P %] | n-Butyl ethylphosphinate (as Al salt) | 10 | | | | | | 0.05 | 10 | 1.5 |
| | sec-Butyl ethylphosphinate (as Al salt) | | 0.05 | 10 | | | | | 1.8 |
| | Ethyl n-hexylphosphinate (as Al salt) | | | | 0.05 | 5 | | | |
| | Fe content [ppm] | 1000 | 22 | 1000 | 23 | 1000 | 20 | 1000 | 52 |
| | Therm. stability [° C.] | 373 | 339 | 371 | 334 | 369 | 351 | 353 | 365 |
| | Processing window [%] | 4.1 | 5 | 4.5 | 7 | 4.2 | 4.5 | 4.8 | 4.3 |

In the above tables, thermal stability was measured with the aid of thermogravimetry (TGA). The temperature reported is that at which there is 2% by weight of weight loss.

The processing window of the polymer molding compound was likewise determined by TGA. The weight loss is measured in percent by weight at 330° C. after 1 h. TGA is conducted under an air atmosphere.

In the case of the polymer molding compound, the maximum scope of the flame retardant composition of the invention is polyamide, MPP (melamine polyphosphate), glass fibers, zinc borate and wax.

The invention claimed is:

1. A flame retardant mixture comprising:
99.9999% to 75% by weight of diorganylphosphinic acid salt as component A); and
0.0001% to 13% by weight of iron in the form of an iron-containing substance B1) as component B), where the amount of B1) is 0.0001% to 25% by weight,
where the sum total of A) and B1) is 100% by weight,
wherein the diorganylphosphinic acid salts conform to the formula (II)

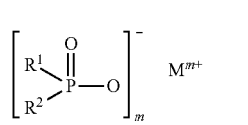

(II)

wherein

R$^1$ and R$^2$ are the same or different and are independently methyl, ethyl, n-propyl, isopropyl, butyl, n-butyl, tert-butyl, n-pentyl, 2-pentyl, 3 pentyl, 2-methylbutyl, 3-methylbutyl (isopentyl), 3-methylbut-2-yl, 2-methyl-but-2-yl, 2,2-dimethylpropyl (neopentyl), hexyl, heptyl, octyl, nonyl, decyl, cyclopentyl, cyclopentylethyl, cyclohexyl, cyclohexylethyl, phenyl, phenylethyl, methylphenyl and/or methylphenylethyl, m is 1 to 4, and M is Mg, Ca, Al, Sb, Sn, Ge, Ti, Zr, Zn, Ce, Bi, Sr, Mn, Li, Na and/or K, and wherein component B1) is present in the form of (a) iron(II) bis and/or iron(III) tris: -(diethylphosphinate), -(dipropylphosphinate), -(butylethylphosphinate), -(n-butylethylphosphinate), -(sec-butylethylphosphinate), -(hexylethylphosphinate), -(dibutylphosphinate), -(hexylbutylphosphinate), -(octylethylphosphinate), -(ethyl(cyclopentylethyl)phosphinate), -(butyl(cyclopentylethyl)phosphinate), -(ethyl(cyclohexylethyl)phosphinate), -(butyl(cyclohexylethyl)phosphinate), -(ethyl(phenylethyl)phosphinate), -(butyl(phenylethyl)phosphinate), -(ethyl(4-methylphenylethyl)phosphinate), -(butyl(4-methylphenylethyl)phosphinate), -(butylcyclopentylphosphinate), -(butylcyclohexylethylphosphinate), -(butylphenylphosphinate), -(ethyl(4-methylphenyl)phosphinate) and/or -(butyl(4-methylphenyl)phosphinate); (b) iron (II) mono and/or iron(III) mono: -(ethylphosphinate), -(propylphosphinate), -(butylphosphinate), -(n-butylphosphinate), -(sec-butylphosphinate), -(hexylphosphinate) and/or -(octylphosphinate); (c) iron(II) and/or iron(III): ethylphosphonate, propylphosphonate, butylphosphonate, n-butylphosphonate, sec-butylphosphonate, hexylphosphonate, octylphosphonate, and/or (d) iron(II) and/or iron(III) salts of: ethyl(cyclopentylethyl)phosphinic acid, butyl(cyclopentylethyl)phosphinic acid, ethyl(cyclohexylethyl)phosphinic acid, butyl(cyclohexylethyl)phosphinic acid, ethyl(phenylethyl)phosphinic acid, butyl(phenylethyl)phosphinic acid, ethyl(4-methylphenylethyl)phosphinic acid, ethylphenylphosphinic acid, butyl(4-methylphenylethyl) phosphinic acid, butylcyclopentylphosphinic acid, butylcyclohexylethylphosphinic acid, butylphenylphosphinic acid, ethyl(4-methylphenyl)phosphinic acid, butyl(4-methylphenyl)phosphinic acid, ethylphosphinylacetic acid and/or ethylphosphinylbutyric acid, hydroxymethyl(ethyl)ethylphosphinic acid, 1 hydroxy-1-methylpropylethylphosphinic acid, butyl ethylphosphonate, acylethylphosphonic anhydride, butylethylphosphonic acid, butylethylphosphinic acid, ethylphosphinylisobutyronitrile (1-cyano-1-methyl-ethylethylphosphinic acid), propylethylphosphinic acid, t-butyl ethylphosphonate, t-butylethylphosphinic acid, hydroxymethyl(butyl)ethylphosphinic acid, 3-hydroxy-3-methylpentylethylphosphinic acid, propoxyethylethylphosphinic acid, phenylethylethylphosphinic acid, 2-ethylphosphinylethyl laurate, ethylpentylphosphinic acid, t-butoxyethylethylphosphinic acid, ethylphosphinylisohexanonitrile, hexylethylphosphinic acid and/or ethylphosphinylethyl sulfate.

2. The flame retardant mixture as claimed in claim 1, which comprises 99.9995% to 95% by weight of component A) and 0.0005% to 5% by weight of component B).

3. The flame retardant mixture as claimed in claim 1, wherein components A) and B1) are in the form of a physical mixture.

4. The flame retardant mixture as claimed in claim 1, which comprises:
99.8999% to 75% by weight of component A),
0.0001% to 20% by weight of component B1), and a further component C), wherein component C) is a compound,
where the sum total of components A), B1) and C) is 100% by weight, with the proviso that components A), B1) and C) are each different compounds.

5. The flame retardant mixture as claimed in claim 4, wherein components A), B1) and C) are in the form of a physical mixture with one another.

6. The flame retardant mixture as claimed in claim 4, wherein components A) and C) form a homogeneous chemical compound with one another and they are in the form of a physical mixture with component B1).

7. The flame retardant mixture as claimed in claim 4, wherein component C) comprises telomers of the formula (III)

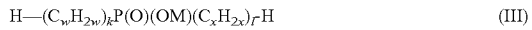

where, in formula (III), independently of one another,
k is 1 to 9,
l is 1 to 9,
w is 2 to 9,
x is 2 to 9, and
M is Mg, Ca, Al, Sb, Sn, Ge, Ti, Fe, Zr, Zn, Ce, Bi, Sr, Mn, Li, Na, K and/or a protonated nitrogen base,
and the $(C_wH_{2w})_k$, $(C_xH_{2x})_l$ groups may be linear or branched;
and/or the telomers are those of the formula (I)

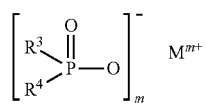

where
$R^3$, $R^4$ are the same or different and are $C_6$-$C_{10}$-arylene, $C_7$-$C_{20}$-alkylarylene, $C_7$-$C_{20}$-arylalkylene and/or $C_3$-$C_{16}$-cycloalkyl or -bicycloalkyl,
M is Mg, Ca, Al, Sb, Sn, Ge, Ti, Fe, Zr, Zn, Ce, Bi, Sr, Mn, Li, Na, K and/or a protonated nitrogen base; and components A), B1) and C) are different compounds.

8. The flame retardant mixture as claimed in claim 7, wherein, in formula (III), w and x are each 2 or 3 and k and l are each 1 to 3 and M is Al, Ti, Fe or Zn.

9. The flame retardant mixture as claimed in claim 7, wherein the telomers are metal salts of ethylbutylphosphinic acid, dibutylphosphinic acid, ethylhexylphosphinic acid, butylhexylphosphinic acid, ethyloctylphosphinic acid, sec-butylethylphosphinic acid, 1-ethylbutyl(butyl)phosphinic acid, ethyl(1-methylpentyl)phosphinic acid, di-sec-butylphosphinic to acid, di-1-methylpropylphosphinic acid, propyl(hexyl)phosphinic acid, dihexylphosphinic acid, hexyl(nonyl)phosphinic acid, propyl(nonyl)phosphinic acid, dinonylphosphinic acid, dipropylphosphinic acid, butyl(octyl)phosphinic acid, hexyl(octyl)phosphinic acid, dioctylphosphinic acid, ethyl(cyclopentylethyl)phosphinic acid, butyl(cyclopentylethyl)phosphinic acid, ethyl(cyclohexylethyl)phosphinic acid, butyl(cyclohexylethyl)phosphinic acid, ethyl(phenylethyl)phosphinic acid, butyl(phenylethyl) phosphinic acid, ethyl(4-methylphenylethyl)phosphinic acid, butyl(4-methylphenylethyl)phosphinic acid, butylcyclopentylphosphinic acid, butylcyclohexylethylphosphinic acid, butylphenylphosphinic acid, ethyl(4-methylphenyl) phosphinic acid and/or butyl(4-methylphenyl)phosphinic acid, ethylphosphinylisobutyronitrile (1-cyano-1-methyl-ethylethylphosphinic acid), propylethylphosphinic acid, hydroxymethyl(butyl)ethylphosphinic acid, 3-hydroxy-3-methylpentylethylphosphinic acid, propoxyethylethylphosphinic acid, phenylethylethylphosphinic acid, ethylpentylphosphinic acid, t-butoxyethylethylphosphinic acid, ethylphosphinylisohexanonitrile, hexylethylphosphinic acid and/or ethylphosphinylethyl sulfate, where the metal of the metal salt comes from the group of Mg, Ca, Al, Sb, Sn, Ge, Ti, Fe, Zr, Zn, Ce, Bi, Sr, Mn, Li, Na and/or K.

10. The flame retardant mixture as claimed in claim 4, which further comprises synergists as component D), where the synergists are melamine phosphate, dimelamine phosphate, pentamelamine triphosphate, trimelamine diphosphate, tetrakismelamine triphosphate, hexakismelamine pentaphosphate, melamine diphosphate, melamine tetraphosphate, melamine pyrophosphate, melamine polyphosphates, melam polyphosphates, melem polyphosphates and/or melon polyphosphates; or melamine condensation products, as melam, melem and/or melon; or oligomeric esters of tris(hydroxyethyl) isocyanurate with aromatic polycarboxylic acids, benzoguanamine, tris(hydroxyethyl) isocyanurate, allantoin, glycoluril, melamine, melamine cyanurate, urea cyanurate, dicyandiamide and/or guanidine; or nitrogen-containing phosphates of the formula $(NH_4)_yH_{3-y}PO_4$ or $(NH_4PO_3)_z$ with y=1 to 3 and z=1 to 10 000; or aluminum phosphites, aluminum pyrophosphites, aluminum phosphonates, aluminum pyrophosphonates; or silicates, zeolites, silicas, ceramic powder, zinc compounds, tin oxide hydrate, magnesium hydroxide, hydrotalcite, magnesium carbonate and/or calcium magnesium carbonate.

11. The flame retardant mixture as claimed in claim 10, which comprises:
a) component A),
b) component B1),
c) component C), and
d) component D),
where the sum total of A), B1), C) and D) is 100% by weight, with the proviso that A), B1) and C) are different compounds.

12. The flame retardant mixture as claimed in claim 1, which comprises:
a particle size of 0.01 to 1000 μm,
a bulk density of 50 to 1500 g/L,
a tamped density of 100 g/L to 1100 g/L,
an angle of repose of 5 to 45 degrees,
a BET surface area of 1 to 40 m$^2$/g,
L color values of 85 to 99.9,
a color values of -4 to +9, and
b color values of -2 to +6.

13. The flame retardant mixture as claimed in claim 1, which comprises:
a particle size of 0.5 to 800 μm,
a bulk density of 80 to 800 g/L,
a tamped density of 600 g/L to 800 g/L, and
an angle of repose of 10 to 40 degrees.

14. A flame-retardant thermoplastic or thermoset polymer molding composition or polymer molding, film, filament or fiber comprising 0.5% to 50% by weight of flame retardant mixtures as claimed in claim 1, 0.5% to 95% by weight of thermoplastic or thermoset polymer or mixtures thereof, 0% to 55% by weight of additives and 0% to 70% by weight of filler or reinforcing materials, where the sum of the components is 100% by weight; and where the polymer comprises thermoplastic polymers of the HI (high-impact) polystyrene, polyphenylene ether, polyamide, polyester or polycarbonate, and blends or polymer blends of the ABS (acrylonitrile-butadiene-styrene) or PC/ABS (polycarbonate/acrylonitrile-butadiene-styrene) or PPE/HIPS (polyphenylene ether/HI polystyrene) polymer, and/or thermoset polymers of the formaldehyde-, epoxide- or melamine-phenolic resin polymer, unsaturated polyester, epoxy resin and/or polyurethane.

15. The thermoplastic or thermoset polymer molding composition, polymer molding, film, filament or fiber as claimed in claim 14, which comprises antioxidants, UV stabilizers, gamma ray stabilizers, hydrolysis stabilizers, antistats, emulsifiers, nucleating agents, plasticizers, processing auxiliaries, impact modifiers, dyes, or pigments.

* * * * *